US010318121B2

(12) United States Patent
Yoshida et al.

(10) Patent No.: US 10,318,121 B2
(45) Date of Patent: Jun. 11, 2019

(54) CONTROL METHOD

(71) Applicant: Panasonic Intellectual Property Corporation of America, Torrance, CA (US)

(72) Inventors: Chikara Yoshida, Kanagawa (JP); Masayuki Kozuka, Osaka (JP); Toshihisa Nakano, Osaka (JP); Tsutomu Sekibe, Osaka (JP); Jun Yamaguchi, Osaka (JP); Kazushige Yamada, Osaka (JP); Kenji Shimizu, Kanagawa (JP); Masaki Takahashi, Osaka (JP); Yuri Nishikawa, Osaka (JP); Motoji Ohmori, Osaka (JP); Hiroyuki Takemura, Osaka (JP); Takeshi Hosaka, Osaka (JP)

(73) Assignee: PANASONIC INTELLECTUAL PROPERTY CORPORATION OF AMERICA, Torance, CA (US)

( * ) Notice: Subject to any disclaimer, the term of this patent is extended or adjusted under 35 U.S.C. 154(b) by 640 days.

(21) Appl. No.: 14/381,138

(22) PCT Filed: Dec. 25, 2013

(86) PCT No.: PCT/JP2013/007590
§ 371 (c)(1),
(2) Date: Aug. 26, 2014

(87) PCT Pub. No.: WO2014/103307
PCT Pub. Date: Jul. 3, 2014

(65) Prior Publication Data
US 2015/0067528 A1    Mar. 5, 2015

Related U.S. Application Data

(60) Provisional application No. 61/746,772, filed on Dec. 28, 2012.

(51) Int. Cl.
*G06F 3/0481* (2013.01)
*G06F 3/0482* (2013.01)
(Continued)

(52) U.S. Cl.
CPC .......... *G06F 3/0484* (2013.01); *G06F 3/0482* (2013.01); *G06F 3/04817* (2013.01); *G08C 17/02* (2013.01); *G08C 2201/34* (2013.01)

(58) Field of Classification Search
CPC .... G06F 3/0481; G06F 3/0482; G06F 3/0483; G06F 9/4443; G06F 3/04817; H04N 5/44543
See application file for complete search history.

(56) References Cited

U.S. PATENT DOCUMENTS 6,756,998 B1 * 6/2004 Bilger ................. H04L 12/2803
715/734
6,909,921 B1 * 6/2005 Bilger .................... G05B 15/02
700/14

(Continued)

FOREIGN PATENT DOCUMENTS

JP   2003-111157   4/2003
JP   2003-219485   7/2003

(Continued)

OTHER PUBLICATIONS

International Search Report dated Feb. 4, 2013 in International Application No. PCT/JP2013/007590.

*Primary Examiner* — Kevin L Young
*Assistant Examiner* — Erik V Stitt
(74) *Attorney, Agent, or Firm* — Wenderoth, Lind & Ponack, L.L.P.

(57) ABSTRACT

A control method according to the present disclosure is used in a remote control system including apparatuses and an information terminal that controls at least one of the appa- (Continued)

ratuses via a network. The control method includes: a step (S2) of displaying, on a user interface region of a display unit of the information terminal, apparatus icons indicating target apparatus candidates among the apparatuses; a step (S3) of obtaining, via the network, (a) apparatus state information related to the apparatuses and (b) sensor information that is a value indicating a spatial environment in which the apparatuses are located; and a step (S4) of (i) determining priorities of the target apparatus candidates based on the apparatus state information and the sensor information, all of which are obtained in the step (S3), and (ii) sorting, according to the determined priorities, the apparatus icons displayed on the user interface region.

7 Claims, 13 Drawing Sheets

(51) Int. Cl.
*G06F 3/0483* (2013.01)
*G06F 21/00* (2013.01)
*G06F 3/0484* (2013.01)
*G08C 17/02* (2006.01)

(56) References Cited

U.S. PATENT DOCUMENTS

| | | | |
|---|---|---|---|
| 7,627,825 B2 | 12/2009 | Kakuda | |
| 8,024,054 B2* | 9/2011 | Mairs | G09B 25/04 700/17 |
| 8,072,324 B2* | 12/2011 | Erickson | H04Q 9/00 340/521 |
| 8,214,061 B2* | 7/2012 | Westrick, Jr. | H05B 37/0218 315/312 |
| 8,312,105 B2* | 11/2012 | Abernethy, Jr. | G06F 3/0482 707/751 |
| 8,387,892 B2* | 3/2013 | Koster | F24F 11/006 236/1 B |
| 9,224,290 B1* | 12/2015 | Mason | G08C 17/02 |
| 9,823,672 B2* | 11/2017 | McCurnin | G05D 23/1905 |
| 2002/0147717 A1* | 10/2002 | Barros | H04L 29/06 |
| 2005/0172228 A1 | 8/2005 | Kakuda | |
| 2006/0089538 A1* | 4/2006 | Cuddihy | A61B 5/0002 600/300 |
| 2007/0240051 A1* | 10/2007 | Sherrill | G05B 23/0267 715/700 |
| 2007/0273307 A1* | 11/2007 | Westrick | H05B 37/0218 315/312 |
| 2008/0092075 A1* | 4/2008 | Jacob | H05B 37/0254 715/771 |
| 2008/0115087 A1* | 5/2008 | Rollin | G06Q 10/107 715/811 |
| 2009/0079555 A1* | 3/2009 | Aguirre De Carcer | G07C 5/008 340/441 |
| 2010/0226662 A1* | 9/2010 | Takatani | G03G 15/5004 399/8 |
| 2010/0245259 A1* | 9/2010 | Bairagi | G05B 19/0423 345/173 |
| 2011/0138310 A1* | 6/2011 | Gomez | H04L 41/082 715/769 |
| 2011/0260871 A1* | 10/2011 | Karkowski | G08B 21/0227 340/573.1 |
| 2012/0062912 A1* | 3/2012 | St. Jacques, Jr. | G06F 3/1204 358/1.9 |
| 2012/0154108 A1 | 6/2012 | Sugaya | |
| 2013/0226316 A1* | 8/2013 | Duchene | G05B 15/02 700/17 |
| 2013/0264943 A1* | 10/2013 | Bora | H05B 33/0863 315/113 |

FOREIGN PATENT DOCUMENTS

| | | | | |
|---|---|---|---|---|
| JP | 2004-235962 | | 8/2004 | |
| JP | 2005-303423 | | 10/2005 | |
| JP | 2010-41344 | | 2/2010 | |
| JP | 2011186779 | * | 3/2011 | G06Q 10/00 |
| JP | 2012-142907 | | 7/2012 | |

* cited by examiner

FIG. 4

| Room | Apparatus ID | Apparatus type | Operational state | Behavior |
|---|---|---|---|---|
| Living room | A10 | Air conditioner | ON | High power Setting 22 °C |
| | A11 | Humidifier | OFF | |
| | A12 | Dehumidifier | OFF | |
| | A13 | TV | OFF | |
| | A14 | Lighting device | ON | All lighting devices are ON |
| Laundry room | A20 | Washing machine | ON | Dewatering |
| Bedroom | A30 | Air conditioner | OFF | |
| | A31 | Humidifier | OFF | |
| | A32 | Dehumidifier | OFF | |
| | A33 | Lighting device | OFF | |

FIG. 5

| Room | Sensor ID | Sensor type | Value |
|---|---|---|---|
| Living room | S10 | Humidity | 21 °C |
| | S11 | Humidity | 43 % |
| | S12 | Human detection | There is a human. |
| | S13 | Illuminance | 300 lx |
| Laundry room | S20 | Temperature | 18 °C |
| | S21 | Human detection | no human |
| Bedroom | S30 | Temperature | 15 °C |
| | S31 | Humidity | 35 % |
| | S32 | Human detection | There is a human. |
| | S33 | Illuminance | 80 lx |

FIG. 6

| Apparatus type | Sensor type | Sensor value | Behavior | Priority |
|---|---|---|---|---|
| Air conditioner | Temperature sensor | Room temperature > 30 °C | Cool; High power | High |
| | | Room temperature > 25 °C | Cool; Low power | Middle |
| | | Room temperature < 15 °C | Warm; Low power | Middle |
| | | Room temperature < 10 °C | Warm; High power | High |
| | | Other | — | Low |
| | Timer | Continuous operation time > 50 hours | Stop operation | High |
| | | Other | — | Low |
| Humidifier | Humidity sensor | Humidity < 40 % | Humidify | Middle |
| | | Humidity < 30 % | Humidify | High |
| | | Humidity > 65 % | Stop operation | Middle |
| | | Humidity > 75 % | Stop operation | High |
| | | Other | — | Low |
| Lighting device | Illuminance sensor | Illuminance > 500 lx | Power OFF | Middle |
| | | Illuminance < 70 lx | Power ON | High |
| | | Other | — | Low |

FIG. 11

| Date/Time | Apparatus ID | Operation |
|---|---|---|
| ... | ... | ... |
| 2012/12/27 18:00 | 17 | Power ON |
| 2012/12/27 18:01 | 15 | Power ON |
| 2012/12/27 18:02 | 15 | Channel UP |
| ... | ... | ... |

FIG. 12

| Date/Time | Apparatus ID | Operation |
|---|---|---|
| ... | ... | ... |
| 2012/12/17 18:00 | Living room | Enter |
| 2012/12/17 22:00 | Living room | Leave |
| 2012/12/17 22:02 | Bedroom | Enter |
| ... | ... | ... |

FIG. 14

| Room | Sensor ID | Sensor type | Value |
|---|---|---|---|
| Living room | S10 | Humidity | 21 °C |
| | S11 | Humidity | 43 % |
| | S12 | Human detection | There is a human. |
| | S13 | Camera | There is person A. |
| | S14 | Illuminance | 300 lx |
| Laundry room | S20 | Temperature | 18 °C |
| | S21 | Human detection | no human |
| | S22 | Camera | no human |
| Bedroom | S30 | Temperature | 15 °C |
| | S31 | Humidity | 35 % |
| | S32 | Human detection | There is a human. |
| | S33 | Camera | There is person B. |
| | S34 | Illuminance | 80 lx |

CONTROL METHOD

TECHNICAL FIELD

The present invention relates to control method's used in remote control systems.

BACKGROUND ART

In recent years, with the development of network environments in home, not only information apparatuses, such as personal computers, but also home appliances, such as television sets (TVs), video recorders, air conditioners, and refrigerators, have been getting connected to a network. The network connection provides various types of usability to users. For example, users can control home appliances via a network.

For example, Patent Literature 1 (PTL 1) discloses a technique relating to an integrated controller capable of appropriately controlling apparatuses including home appliances.

CITATION LIST

Patent Literature

[PTL 1] Japanese Unexamined Patent Application Publication No. 2003-111157

SUMMARY OF INVENTION

Technical Problem

However, in the conventional technologies as disclosed in PTL 1, items and the like indicating controllable apparatuses are displayed always in the same arrangement (in other words, sorted always in the same manner). Therefore, bothersome procedure is sometimes necessary to control a target apparatus according to the situation.

In order to address the above problem, an object of the present invention is to provide a control method of appropriately controlling a target apparatus according to a situation of the target apparatus by using an information terminal.

Solution to Problem

In accordance with an aspect of the present invention for achieving the object, there is provided a control method used in a remote control system including a plurality of apparatuses and an information terminal that controls at least one of the apparatuses as a target apparatus via a network, the control method including: displaying, on a user interface region of a display unit of the information terminal, apparatus icons indicating target apparatus candidates among the apparatuses; obtaining, via the network, (a) pieces of apparatus state information related to the apparatuses and (b) sensor information that is a value indicating a spatial environment in which the apparatuses are located; (i) determining priorities of the target apparatus candidates based on the pieces of the apparatus state information and the sensor information, all of which are obtained in the obtaining, and (ii) sorting, according to the determined priorities, the apparatus icons displayed on the user interface region of the display unit of the information terminal; generating a control signal for causing, as the target apparatus, an apparatus corresponding to an apparatus icon to perform an operation, when the apparatus icon is selected from the apparatus icons which are sorted; and transmitting the control signal to the target apparatus via the network.

These general and specific aspects may be implemented to a system, a method, an integrated circuit, a computer program, and a computer-readable recording medium, such as a Compact Disc-Read. Only Memory (CDROM), and may be implemented also to a desired combination of them.

BRIEF DESCRIPTION OF DRAWINGS

FIG. 4 illustrates an example of an apparatus state information management table according to Embodiment.

FIG. 5 illustrates an example of a sensor information management table according to Embodiment.

FIG. 6 illustrates an example of an operation priority management table according to Embodiment.

FIG. 11 illustrates an example of an apparatus operation log table according to Variation 1 of Embodiment.

FIG. 12 illustrates an example of a room enter/leave log table according to Variation 1 of Embodiment.

FIG. 14 illustrates an example of a sensor information management table according to Variation 2 of Embodiment.

Figure 1:
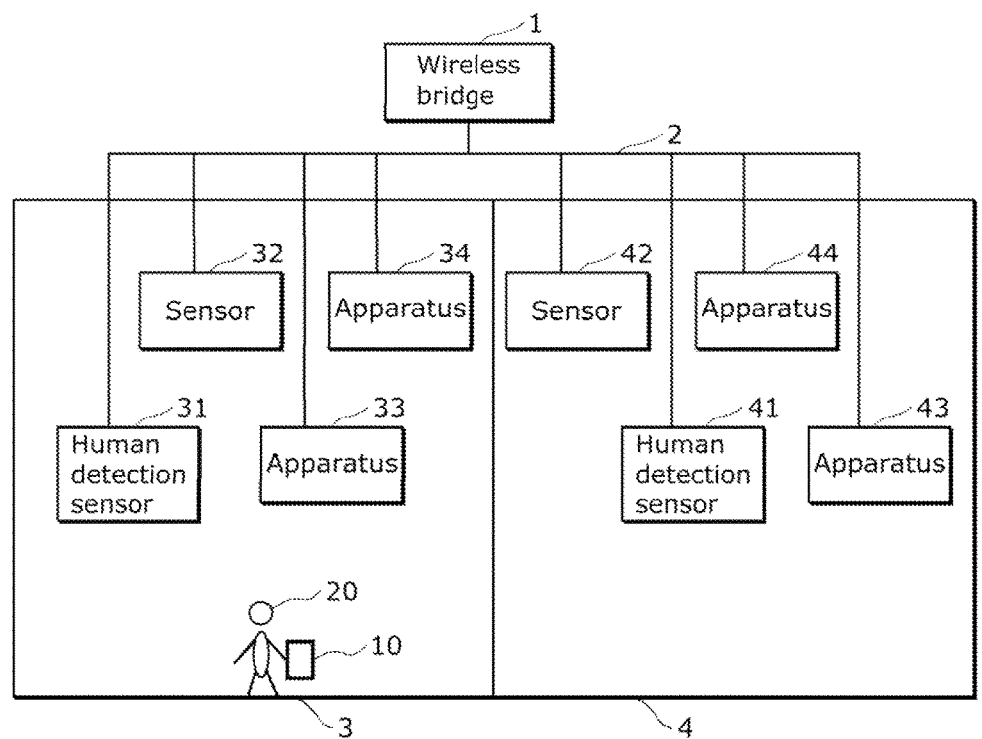
FIG. 1 is a diagram illustrating an example of an environment using a remote control system according to Embodiment.

DESCRIPTION OF EMBODIMENT (Observation Based on which Present Invention is Conceived)

However, in the conventional technologies as disclosed in PTL 1, items and the like indicating controllable apparatuses are displayed always in the same arrangement. Therefore, bothersome procedure is sometimes necessary to control a target apparatus according to the situation.

More specifically, if one of home appliances is to be controlled (hereinafter, such a home appliance is referred to also as a "target apparatus"), controllable items (control menus) of providable functions of the target apparatus vary depending on various situations, for example, depending on an "operator (person who controls) (who)", a "time of operation (control) (when)", a "place for operation (control) (at where)", the "apparatus to be controlled (what)", and a "place where the apparatus to be controlled is set (to where)". Furthermore, a target apparatus which the user wishes to immediately control varies depending on the situation such as environment of the user. Therefore, if items and the like indicating controllable apparatuses are displayed always in the same arrangement, bothersome procedure is sometimes necessary to select a target apparatus which the user wishes to control.

In order to address the above problem, an object of the present invention is to provide a control method of appropriately controlling a target apparatus according to a situation of the target apparatus by using an information terminal.

In accordance with an aspect of the present invention for achieving the object, there is provided a control method used in a remote control system including a plurality of apparatuses and an information terminal that controls at least one of the apparatuses as a target apparatus via a network, the control method including: displaying, on a user interface region of a display unit of the information terminal, apparatus icons indicating target apparatus candidates among the apparatuses; obtaining, via the network, (a) pieces of apparatus state information related to the apparatuses and (b) sensor information that is a value indicating a spatial environment in which the apparatuses are located; (i) determining priorities of the target apparatus candidates based on the pieces of the apparatus state information and the sensor information, all of which are obtained in the obtaining, and (ii) sorting, according to the determined priorities, the apparatus icons displayed on the user interface region of the display unit of the information terminal; generating a control signal for causing, as the target apparatus, an apparatus corresponding to an apparatus icon to perform an operation, when the apparatus icon is selected from the apparatus icons which are sorted; and transmitting the control signal to the target apparatus via the network.

The above method enables the user to appropriately control a target apparatus according to a situation of the target apparatus by using the information terminal.

Here, for example, it is also possible that the generating of the control signal includes: displaying, on the user interface region of the display unit of the information terminal, one or more control menus corresponding to the target apparatus corresponding to the apparatus icon which is selected; and generating the control signal for causing the target apparatus according to a control menu to perform an operation, when the control menu is selected from the one or more control menus displayed on the user interface region of the display unit of the information terminal.

For example, it is further possible that in the sorting of the apparatus icons, an apparatus icon indicating an apparatus determined as having a higher priority is displayed on an upper position on a more left or right side of the user interface region of the display unit of the information terminal as viewed by an operator of the information terminal.

For example, it is still further possible that in the determining of the priorities, based on the pieces of the apparatus state information and the sensor information which are obtained in the obtaining, among the target apparatus candidates, an apparatus offering, when controlled by the information terminal, more comfort in a space where an operator of the information terminal is present is determined to have a higher priority.

For example, it is still further possible that in the determining of the priorities, based on the pieces of the apparatus state information and the sensor information which are obtained in the obtaining, among the target apparatus candidates, an apparatus in a space where an operator of the information terminal is not present is determined to have a lower priority than an apparatus in a space where the operator of the information terminal is present.

For example, it is still further possible that in the determining of the priorities, based on the pieces of the apparatus state information and the sensor information which are obtained in the obtaining, among the target apparatus candidates, an apparatus that is currently powered OFF is determined to have a lower priority than an apparatus that is currently powered ON.

These general and specific aspects may be implemented to a system, a method, an integrated circuit, a computer program, and a computer-readable recording medium, such as a CD-ROM, and may be implemented also to a desired combination of them.

The following describes a control method used in a remote control system according to Embodiment of the present invention with reference to the Drawings.

It should be noted that Embodiment described below is a specific example of the present invention. Numerical values, shapes, materials, constituent elements, arrangement positions and the connection configuration of the constituent elements, steps, the order of the steps, and the like described in the following Embodiment is merely an example, and is not intended to limit the present invention. Among the constituent elements in the following Embodiment, constituent elements that are not described in independent claims that show the most generic concept of the present invention are described as elements constituting more desirable configurations.

Embodiment 1.1 Configuration of Remote Control System

The following describes a remote control system according to Embodiment with reference to the Drawings.

FIG. 1 is a diagram illustrating an example of an environment using the remote control system according to Embodiment.

The remote control system according to Embodiment includes: a plurality of apparatuses; and an information terminal 10 that controls at least one of the apparatuses as a target apparatus via a network. The remote control system is used in the environment illustrated in FIG. 1.

In the environment illustrated in FIG. 1, there are a wireless bridge 1, a wired network 2, and rooms 3 and 4. In each of the rooms 3 and 4, there are apparatuses and sensors.

More specifically, in the room 3, there are a group of sensors including a human detection sensor 31 and an other sensor 32, and a plurality of apparatuses including an apparatus 33 and an apparatus 34. These sensors and apparatuses are connected to one another via the wired network 2. In the room 3, there is also a person 20 holding an information terminal 10 in the room 3.

Like the room 3, in the room 4, there are a group of sensors including a human detection sensor 41 and an other sensor 42, and a plurality of apparatuses including an apparatus 43 and an apparatus 44. These sensors and apparatuses are connected to one another via the wired network 2. However, the person 20 is not in the room 4.

The apparatuses (the apparatus 3 the apparatus 34, the apparatus 43, the apparatus 44, . . . ) and the sensors (the human detection sensor 31, the sensor 32, the human detection sensor 41, the sensor 42, . . . ) are connected to one another via the wired network 2 so that each of the apparatuses can refer to pieces of information of the other apparatuses.

The wireless bridge 1 relays the apparatuses and the sensors, all of which are connected to the wired network 2, to the information terminal 10 not connected to the wired network 2. Therefore, the information terminal 10 can refer to pieces of information of the apparatuses and the sensors.

The apparatuses (the apparatus 33, the apparatus 34, the apparatus 43, the apparatus 44 . . . ) are controllable by the information terminal 10. Examples of the apparatuses are a television set (TV), a dehumidifier, a lighting device, an air conditioner, a washing machine, and a humidifier. It should be noted that the apparatuses are not limited to the above examples, but may include a Blu-ray® Disc (BD) recorder, a door intercom, a heating appliance such as a kotatsu (Japanese heating appliance), an Induction Heating (IT) cooking heater, a lighting apparatus, an air conditioner, a water heater, and the like.

The information terminal 10 is a portable device having a display unit with a touch panel function. Examples of the information terminal 10 are a smartphone, a tablet terminal, a television set, and the like. It should be noted that the information terminal 10 is not limited to the above examples. The information terminal 10 may be any kind of device which has a display unit with a touch panel function and is capable of being connected to the apparatuses in the rooms 3 and 4 via the wired network 2. In Embodiment, the information terminal 10 is described as a smartphone.

It should be noted that, in the following description (Embodiment), in order to expressly describe that the user is near the apparatuses, it is assumed that the user is in the room 3 of home. However, the user may be in a larger room of the home or outside the home.

It should also be noted that, in Embodiment, the human detection sensor is described as an example of the sensor for detecting whether or not the person 20 is near a target apparatus, but the sensor is not limited to the human detection sensor. It is also possible to use any means for detecting the presence of the person 20, such as a camera, a motion capture sensor, or a microphone, instead of the human detection sensor.

It should be noted that, in Embodiment, in order to expressly describing the presence of the human detection sensor and the other sensors, the sensors are described as different from the apparatuses. However, the present invention is not limited to the above. Such a sensor may be included in at least one of the apparatuses.

It should be noted that FIG. 1 illustrates, as an example of a network in home, an example of environment where there are both the wired network 2 and a wireless network (not illustrated). However, the network in home is not limited to the above. It is also possible that all the apparatuses, the sensors, and the information terminal 10 are connected to the wired network or the wireless network.

1.2 Structure of Information Terminal

Figure 2:
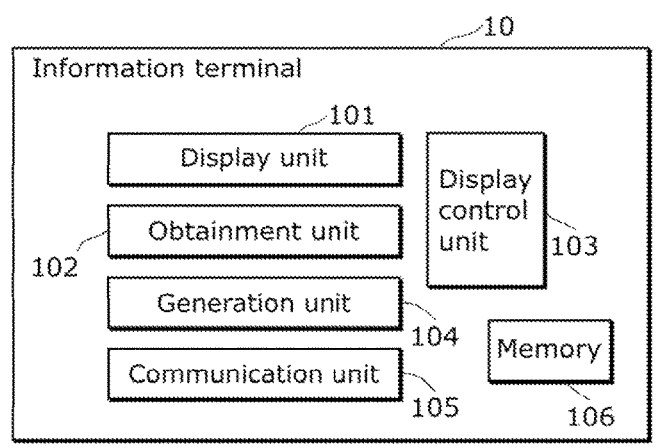
FIG. 2 is a block diagram illustrating an example of a structure of an information terminal according to Embodiment.

FIG. 2 is a block diagram illustrating an example of a structure of the information terminal according to Embodiment.

The information terminal 10 has a function of serving as a remote controller (integrated remote control function) that requests a target apparatus to perform processing. In Embodiment, it is assumed that, in the information terminal 10, the function of serving as a remote controller (integrated remote control application) is provided by an application installed in the information terminal 10.

More specifically, as illustrated in FIG. 2, the information terminal 10 includes a display unit 101, an obtainment unit 102, a display control unit 103, a generation unit 104, a communication unit 105, and a memory 106.

An example of the display unit 101 is a touch display or the like. The display unit 101 has a user interface region (display screen) on which at least touch inputting is possible. The display unit 101 is controlled by the display control unit 103 to display, on the user interface region (display screen), apparatus icons indicating target apparatus candidates among all the apparatuses. For example, the display unit 101 displays apparatus icons on the display screen 101a as illustrated in FIG. 3.

Figure 3:
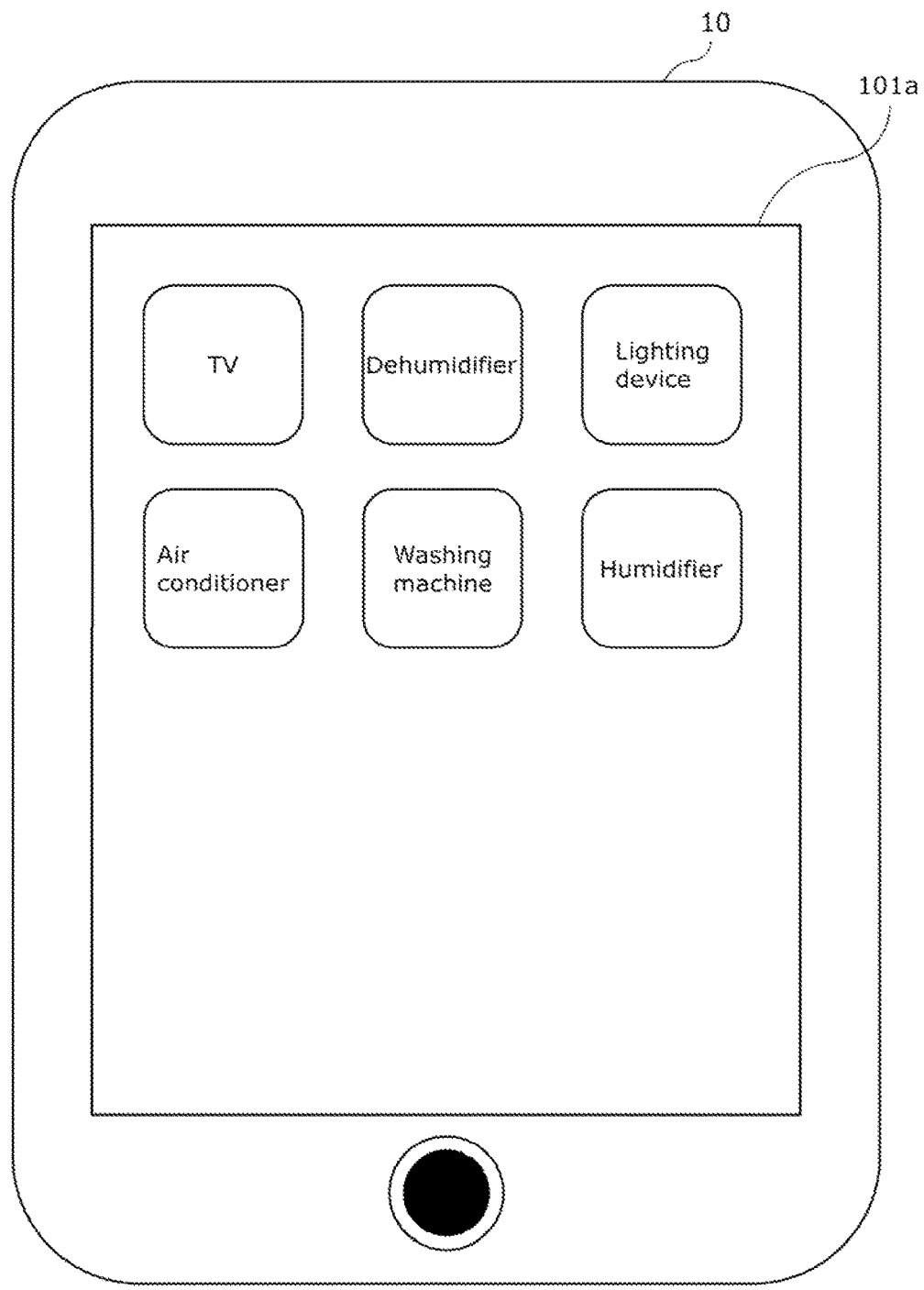
FIG. 3 is a diagram illustrating an example of a display screen of the information terminal according to Embodiment.

Here, FIG. 3 is a diagram illustrating an example of the display screen of the information terminal according to Embodiment. FIG. 3 illustrates an example of the situation where a list of apparatuses to be controlled is displayed as icon display when the integrated remote control application is first started in the information terminal 10. It should be noted that, in Embodiment, the icon display is used as an expression technique of list display. However, the expression technique may be list display or other display form.

The obtainment unit 102 obtains, via the wired network 2, (a) pieces of apparatus state information of the apparatuses, and (b) pieces of sensor information which are values indicating spatial environment in which the apparatuses are located.

For example, the obtainment unit 102 obtains the pieces of the apparatus state information regarding the apparatuses via the wired network 2, and updates an apparatus state information management table as illustrated in FIG. 4, for example.

Here, FIG. 4 illustrates an example of the apparatus state information management table according to Embodiment. The apparatus state information management table illustrated in FIG. 4 manages pieces of information regarding the apparatuses in each of the rooms (the room 3 and the room 4). More specifically, in the apparatus state information management table, a list of "rooms" is managed, and an "apparatus ID", an "apparatus type", and an "operational state" of each apparatus in each of the rooms are managed. Furthermore, in the apparatus state information management table, details (behavior) of the operational state are also managed when a managed apparatus is currently operated. According to Embodiment, in the apparatus state information management table, a living room, a laundry room, and a bedroom are managed as "rooms". The apparatus state information management table indicates that, in the living room, there are an air conditioner, a humidifier, a dehumidifier, a TV, and a lighting device as "apparatuses", and that the air conditioner and the lighting device are currently powered ON. Furthermore, the apparatus state information management table indicates that, in the laundry room, there is a washing machine as an "apparatus", and that the washing machine is currently powered ON. The apparatus state information management table indicates that, in the bedroom, there are an air conditioner, a humidifier, a dehumidifier, and a lighting device as "apparatuses", and that none of the apparatuses is powered ON.

Furthermore, for example, the obtainment unit 102 obtains, from the sensors via the wired network 2, pieces of sensor information that are values indicating spatial environment in which apparatuses are located, and updates the sensor information management table as to be seen, for example, in FIG. 5.

Here, FIG. 5 illustrates an example of the sensor information management table according to Embodiment. In the sensor information management table illustrated in FIG. 5, pieces of sensor information provided from sensors in each of the rooms (the room 3 and the room 4) are managed. More specifically, in the sensor information management table, a list of "rooms" is managed, and a "sensor ID", a "sensor type", and a "value" of each sensor in each of the rooms are managed. In Embodiment, in the sensor information management table, the living room, the laundry room, and the bedroom are managed as the "rooms". In each of the living room and the bedroom, there are a temperature sensor, a humidity sensor, a human detection sensor, and an illuminance sensor, and therefore values of these sensors are managed. Furthermore, in the laundry room, there are a temperature sensor and a human detection sensor, and therefore values of these sensors are managed.

The display control unit 103 determines priorities of the apparatuses based on the pieces of apparatus state information and the pieces of sensor information, all of which are obtained by the obtainment unit 102. Based on the determined priorities, the display control unit 103 sorts apparatus icons displayed on the user interface region (display screen) of the display unit 101 of the information terminal 10.

More specifically, based on the pieces of apparatus state information and the pieces of sensor information all of which are obtained by the obtainment unit 102, the display control unit 103 updates an operation priority management table as illustrated in FIG. 6, for example. Then, according to the updated operation priority management table, the display control unit 103 sorts apparatus icons to be displayed on the user interface region of the display unit 101. Here, FIG. 6 illustrates an example of the operation priority management table according to Embodiment.

Furthermore, with reference to the sensor information management table illustrated in FIG. 6, the display control unit 103 sorts apparatus icons on the display unit 101 so as to further induce the user (operator of the information terminal 10) to control an apparatus having a higher operation priority. Then, the display control unit 103 may cause the apparatus icons to be displayed on the user interface region (display screen) of the display unit 101, so that an apparatus icon of an apparatus determined as a higher priority is arranged on a higher position on the left or right side of the display screen as viewed by the operator of the information terminal 10.

Figure 7A:
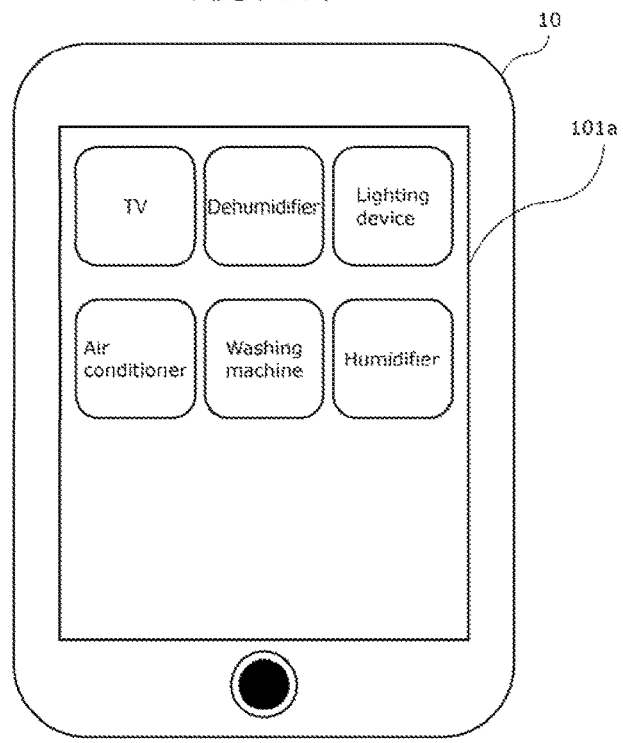
FIG. 7A is a diagram illustrating an example of the display screen of the information terminal according to Embodiment.
Figure 7B:
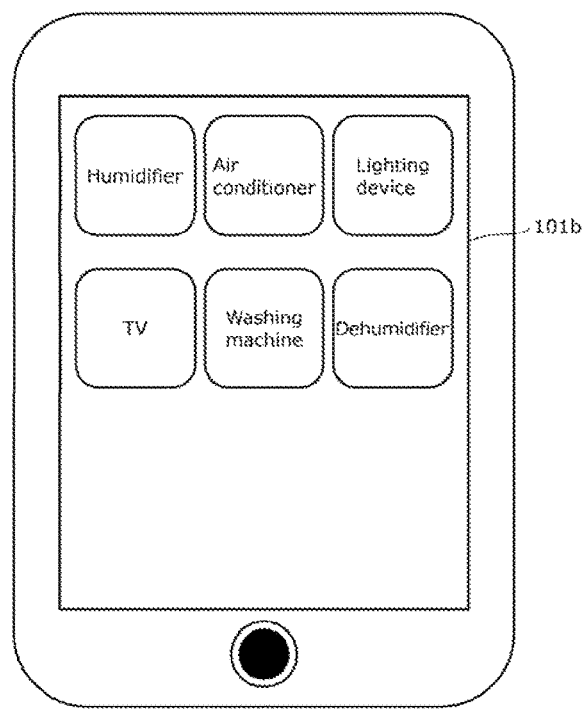
FIG. 7B is a diagram illustrating an example of the display screen of the information terminal according to Embodiment.

Each of FIGS. 7A and 7B is a diagram illustrating an example of the display screen of the information terminal according to Embodiment. FIG. 7A is the same diagram as FIG. 3. FIG. 7B illustrates a display screen 101b on which the arrangement of the apparatus icons in FIG. 7A is changed (sorted). According to the positions of the apparatus icons displayed on the display screen 101b in FIG. 7B, the user learns that the humidifier has the highest operation priority and the dehumidifier has the lowest operation priority.

It should be noted that the method of determining the operation priorities of the display control unit 103 is not limited to the above. For example, based on the pieces of apparatus state information and the pieces of sensor information all of which are obtained by the obtainment unit 102, the display control unit 103 may determine to assign a higher operation priority to an apparatus offering, when controlled by the information terminal 10, more comfort in the space where the operator of the information terminal 10 is present. Moreover, based on the pieces of apparatus state information and the pieces of sensor information all of which are obtained by the obtainment unit 102, the display control unit 103 may determine to assign a lower operation priority to apparatuses in the space where the operator of the information terminal 10 is not present, in comparison to apparatuses in the space where the operator of the information terminal 10 is present. Based on the pieces of apparatus state information and the pieces of sensor information all of which are obtained by the obtainment unit 102, the display control unit 103 may determine a lower operation priority for an apparatus that is powered OFF than an operation priority of an apparatus that is powered ON.

If a first apparatus icon is selected from the sorted apparatus icons by touch-Inputting or the like of the operator of the information terminal 10, the display control unit 103 may cause the display unit 101 to display one or more control menus of the first apparatus corresponding to the selected first apparatus icon.

The memory 106 holds the apparatus state information management table, the sensor information management table, and the operation priority management table which have been described above. Pieces of information in the apparatus state information management table and the sensor information management table are updated by the obtainment unit 102. Pieces of information in the operation priority management table are updated or referred to by the display control unit 103.

When the first apparatus icon is selected from the sorted apparatus icons displayed on the user interface region (display screen) of the display unit 101, the generation unit 104 generates a control signal for controlling a target apparatus corresponding to the selected first apparatus icon.

It should be noted that, when one or more control menus of the target apparatus (here, first apparatus) corresponding to the selected first apparatus icon is displayed on the user interface region (display screen) of the display unit 101, if a first control menu is selected from the control menus, then the generation unit 104 may generate a control signal for causing the control corresponding to the first control menu to be performed on the first apparatus.

The communication unit 105 transmits the control signal, which is generated by the generation unit 104, to the first apparatus (target apparatus) via the wired network 2.

It should be noted that it is described below (in Embodiment) that an operation priority of an air conditioner is determined based on a value of a temperature sensor and a value of a timer, and that an operation priority of a humidifier is determined based on a value of a humidity sensor, that an operation priority of a lighting device is determined based on a value of an illuminance sensor. However, the present invention is not limited to the above. It is also possible to determine such an operation priority based on values of one or more sensors except the above sensors. The values of one or more sensors also mean values of various kinds of sensors. It should also be noted that it is described below in Embodiment that the operation priority is classified into three levels, "high, middle, and lows". However, the present invention is not limited to the above. The operation priority may be classified in any number of levels.

Although it has been described in Embodiment that the apparatus state information management table, the sensor information management table, the operation priority management table which have been described above are held in the memory 106, the present invention is not limited to the above. It is also possible that the apparatus state information management table, the sensor information management table, and the operation priority management table are held not in the memory 104 but in a home server or the like on the wired network 2, if the information terminal 10 can access these tables to update and referred to them.

1.3 Operations of Remote Control System

Next, operations of the remote control system having the above-described configuration are described.

Figure 8:
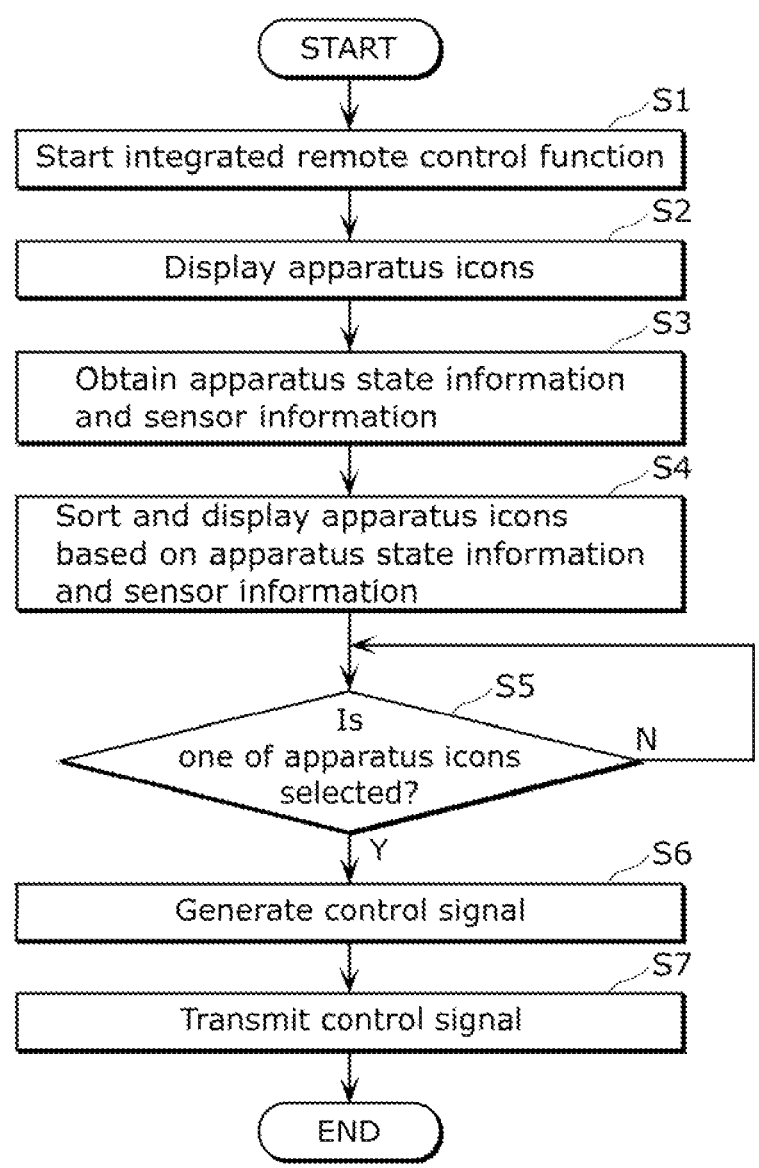
FIG. 8 is a flowchart of a control method performed in the remote control system according to Embodiment.

FIG. 8 is a flowchart of a control method performed in the remote control system according to Embodiment.

First, the user starts the integrated remote control function of the information terminal 10 (S1). In Embodiment, the information terminal 10 starts the integrated remote control function by executing the remote control application providing the function of serving as a remote controller (remote control function).

Next, the remote control system causes the information terminal 10 to display apparatus icons of target apparatus candidates among the apparatuses in the rooms, on the user interface region (display screen) of the display unit 101 of the information terminal 10 (S2).

Next, the remote control system obtains, via the wired network 2, pieces of apparatus state information regarding the apparatuses and pieces of sensor information indicating a spatial environment in which the apparatuses are located (S3).

Next, the remote control system determines operation priorities of the apparatuses based on the pieces of apparatus state information and the pieces of sensor information which have been obtained at S3, and based on the determined operation priorities, sorts apparatus icons of the apparatuses displayed on the user interface region of the display unit 101 of the information terminal 10 (S4).

Next, it is determined whether or not one of the apparatus icons is selected by touch-inputting or the like of the operator of the information terminal 10 (S5).

If one of the apparatus icons is selected (Y at S5) and then a first apparatus icon is selected from the sorted apparatus icons (Y at S5), then the remote control system generates a control signal for controlling an apparatus (target apparatus) corresponding the selected first apparatus icon (S6). On the other hand, if it is determined at S5 that none of the apparatus icons is selected (N at S5), then the processing returns to S5 to perform processing.

Finally, the remote control system transmits the control signal to the target apparatus via the network 2 (S7). More specifically, the communication unit 105 of the information terminal 10 transmits the control signal (processing request) generated by the generation unit 104, to the target apparatus via the wireless bridge 1.

It should be noted that, if the first apparatus on is selected from the sorted apparatus icons by touch-inputting or the like of the operator of the information terminal 10 (Y at S5), then the remote control system may cause the information terminal 10 to display one or more control menus corresponding a first apparatus corresponding the selected first apparatus icon, on the user interface region of the display unit 101 of the information terminal 10. In this case, if a first control menu is selected from one or more control menus displayed on the user interface region of the display unit 101 of the information terminal 10, the remote control system may generate a control signal for controlling the first apparatus according to the first control menu.

1.4 Example

Next, an example of the icon sorting processing at S4 is described in more detail with reference to FIG. 9.

Figure 9:
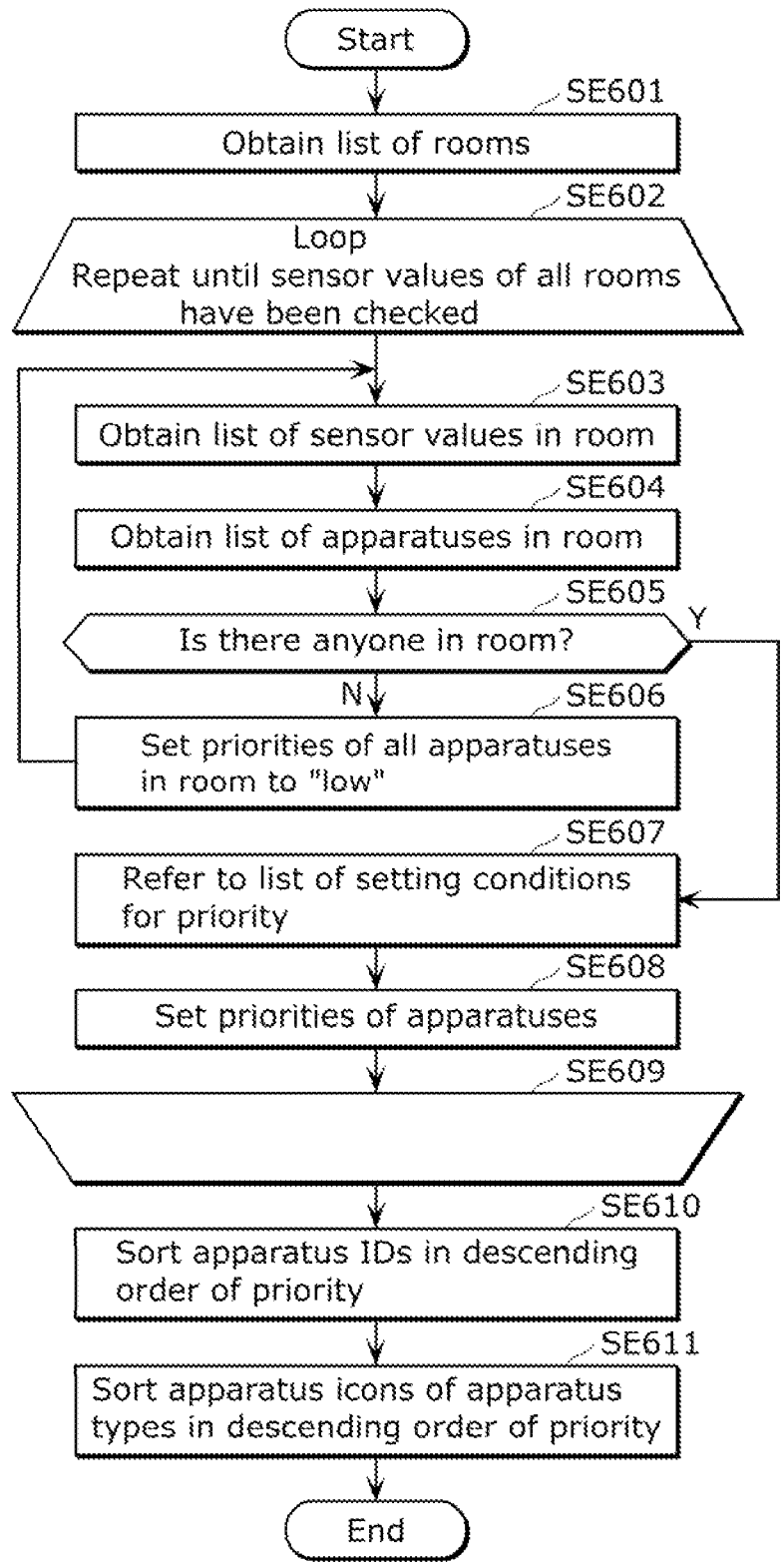
FIG. 9 is a detailed flowchart of icon sorting processing at S4 according to Example of Embodiment.

FIG. 9 is a detailed flowchart of the icon sorting processing at S4 according to Example of Embodiment.

First, the remote control system obtains a list of rooms in home with reference to the apparatus state information management table illustrated in FIG. 4 (SE601).

Next, until values of the sensors in all the rooms to be managed have been obtained, the remote control system repeats the processing, from SE603 to SE608 (SE602 to SE609).

More specifically, at SE603, the remote control system obtains values of the sensors in all the rooms (rooms 3 and 4) to be managed in home, with reference to the sensor information management table illustrated in FIG. 5.

Subsequently, at SE604, with reference to the apparatus state information management table illustrated in FIG. 4, the remote control system obtains a list of apparatuses in each of the target rooms (rooms 3 and 4).

Next, at SE605, with reference to a value of a human detection sensor in each of the target rooms (rooms 3 and 4), the remote control system determines whether or not the person 20 is in the target room.

At SE605, for example, if it is determined that the person 20 is not in the room 4 (N at SE605), then the remote control system determines all operation priorities of the apparatuses in the room 4 are "low" level, and sets the operation priorities in the operation priority management table illustrated in FIG. 6 to the low level (SE606). Then, the processing returns to SE603.

On the other hand, at SE605, if it is determined, for example, that the person 20 is in the room 3 (Y at SE605), then the remote control system confirms setting conditions of operation priorities with reference to the operation priority management table illustrated in FIG. 6 (SE607). Then, operation priorities of apparatuses in the room 3 are set (SE608), and the processing proceeds to SE610.

Next, at SE610, the remote control system sorts apparatus IDs in descending order of operation priority of apparatus.

Finally, the remote control system gathers the operation priorities for each apparatus type and then scores the apparatus type, and sorts icons (apparatus icons) indicating apparatus types in descending order of the score (SE611).

FIG. 7B illustrates an example of the display screen on which the icons are sorted. In other words, on the display screen 101b of the integrated remote control application, the sorted apparatus icons are displayed. In the example illustrated in FIG. 7B, an apparatus icon corresponding to an apparatus having a higher operation priority is arranged in an upper row and a more left column.

In Example, the icon sorting processing is performed according to the flow of FIG. 9 based on the values in the apparatus state information management table, the sensor information management table, and the operation priority management table. Since the example illustrated in FIG. 7B shows that an operation priority of the apparatus type "humidifier" is the highest, an apparatus icon of the "humidifier" is arranged on the upper-left corner.

Although it has been described in Embodiment that each apparatus type is assigned with one icon and a change of an icon arrangement expresses a difference among the operation priorities of the apparatus types, other display forms may be used. For example, it is possible to change colors of the icons in descending order of operation priority, or display a list sorted in descending order of operation priority of apparatus type.

1.5 Effects

As described above, according to Embodiment, it is possible to provide a control method capable of appropriately controlling a target apparatus by using an information terminal according to a situation of the target apparatus.

More specifically, according to the control method of Embodiment, when apparatus icons of apparatus candidates to be controlled among the apparatuses are displayed on the display unit of the information terminal, the apparatus icons are sorted to be displayed on the display unit of the information terminal according to the operation priorities. Therefore, an apparatus icon of an apparatus having a higher operation priority is displayed, for example, on an upper position in the left or right side of the display screen as viewed by the operator of the information terminal. As a result, it is possible to further induce the operator of the information terminal to control an apparatus having a higher priority.

Although it has been described in Embodiment that the apparatus icons are sorted according to the determined operation priorities, the present invention is not limited to the above. If a first apparatus icon is selected from the sorted apparatus icons and one or more control menus of a first apparatus corresponding to the selected first apparatus icon are displayed, it is possible to also sort the control menus according to the operation priorities.

Figure 10:
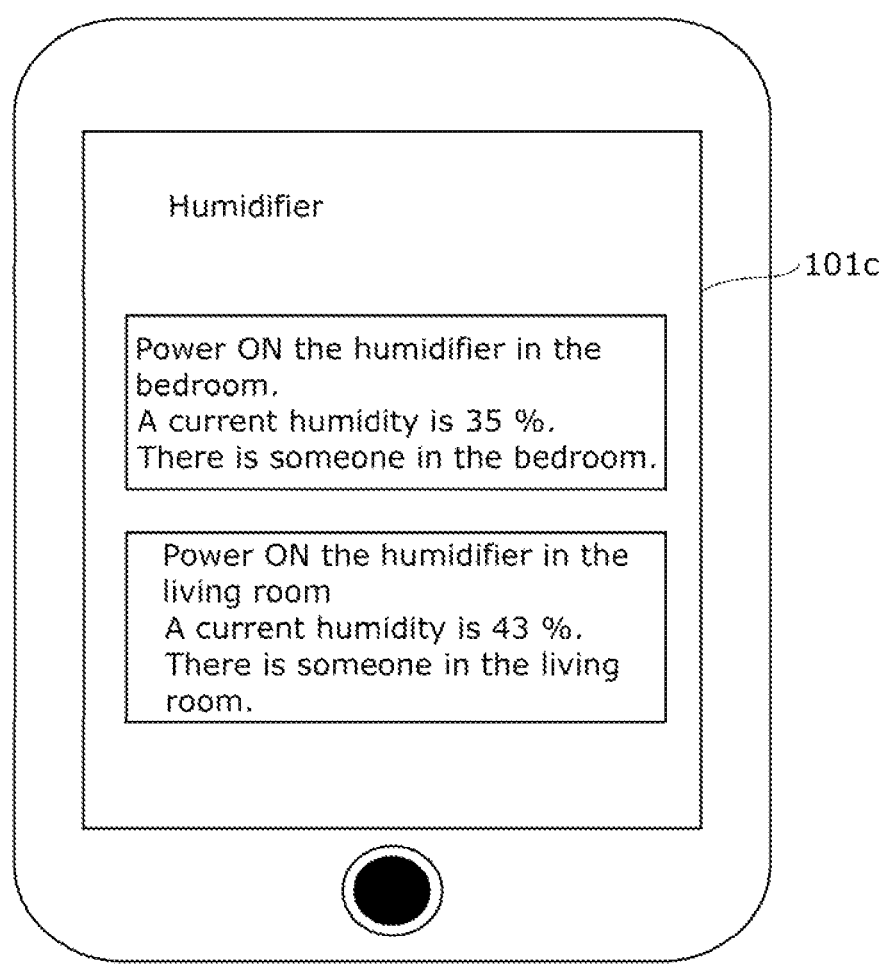
FIG. 10 is a diagram illustrating an example of the display screen of the information terminal on which one of apparatus icons is selected and developed.

FIG. 10 is a diagram illustrating an example of the display screen of the information terminal on which one of the apparatus icons is selected and developed. If an apparatus icon of the "humidifier" is selected on the display screen 101b illustrated in FIG. 7B, for example, all operable control menus (apparatus operation buttons) belonging to the "humidifier" are sorted in descending order of operation priority on the display screen 101c illustrated in FIG. 10. Here, a control menu (apparatus operation button) having a higher priority is displayed on an upper position on the display screen 101c. In other words, as a result of executing the flow of FIG. 9, an operation priority of the "humidifier" in the "bedroom" is "high", and an operation priority of the "humidifier" in the "living room" is "middle", so that a control menu (apparatus operation button) of the "humidifier" in the "bedroom" is arranged on an upper position than a position of a control menu related to the "living room" on the display screen 101c.

(Variation 1)

In Variation 1, the description is given to the case where a room enter/leave log table or the like is also used as the means for detecting the presence of a person 20, in addition to a human detection sensor.

FIG. 11 illustrates an example of an apparatus operation log Viable according to Variation 1 of Embodiment. FIG. 12 illustrates an example of a room enter/leave log table according to Variation 1 of Embodiment.

In Variation 1, the remote control system records three kinds of information, which are "date/time", an "apparatus ID of operation target", and a "performed operation", onto the apparatus operation log table illustrated in FIG. 11, and records three kinds of information, which are "date/time", a "room which a target person enters or leaves from", and "whether the target person enters or leaves", onto the room enter/leave log table illustrated in FIG. 12. It should be noted that the tables in FIGS. 11 and 12 may be recorded by the obtainment unit 102 of the information terminal 10.

Figure 13:
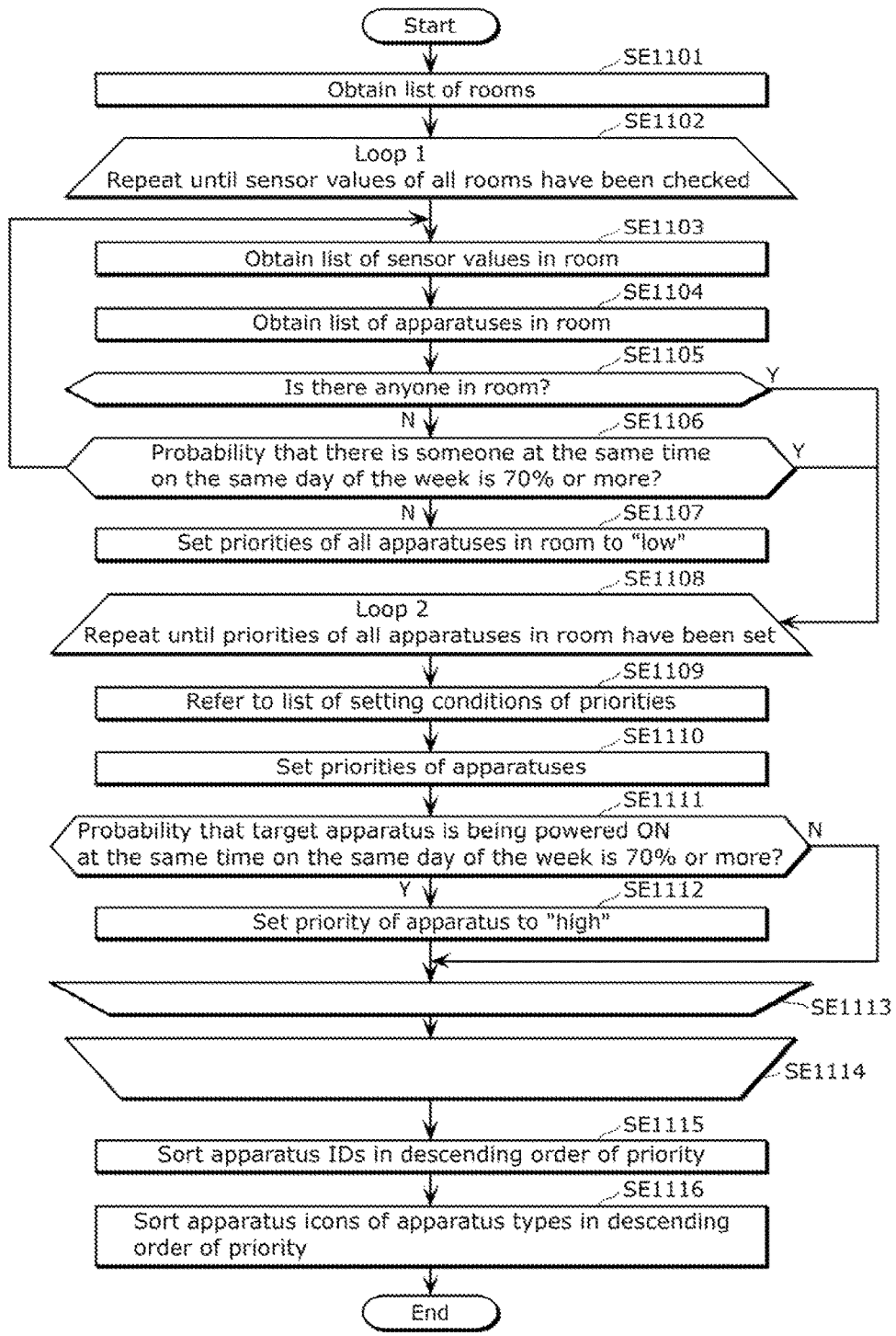
FIG. 13 is a detailed flowchart of icon sorting processing at S4 according to Variation 1 of Embodiment.

Next, an example of the icon sorting processing at S4 is described in more detail according to Variation 1 with reference to FIG. 13.

FIG. 13 is a detailed flowchart of the icon sorting processing at S4 according to Example of Embodiment. In Variation 1, in consideration of the apparatus operation log and the room enter/leave log, the apparatus icons are sorted.

First, the remote control system obtains a list of rooms in home with reference to the apparatus state information management table illustrated in FIG. 4 (SE1101).

Next, until values of sensors in all the rooms to be managed in home have been obtained, the remote control system repeats the processing, from SE11003 to SE1114 (SE1102 to SE1114).

More specifically, at SE1103, the remote control system obtains values of the sensors in all the rooms (rooms 3 and 4) to be managed in home, with reference to the sensor information management table illustrated in FIG. 5.

Subsequently, at SE1104, with reference to the apparatus state information management table illustrated in FIG. 4, the remote control system obtains a list of apparatuses in each of the target rooms (rooms 3 and 4).

Next, at SE1105, with reference to a value of a human detection sensor in each of the target rooms (rooms 3 and 4), the remote control system determines whether or not the person 20 is in the target room.

Subsequently, if it is determined at SE1106 that the person 20 is not in the room (N at SE1105), then the remote control system calculates a probability that the person is in the room on the same day of the week at the same time, with reference to the room enter/leave log table (FIG. 12) of the room. Then, it is determined that the calculated probability exceeds a predetermined value (70% in Variation 1). If the calculated probability is smaller than the predetermined value (N at SE1106), then at following SE1107, all the operation priorities of the apparatuses in the room 4 to be managed are set to "low" level, and the processing returns to SE1102.

On the other hand, if it is determined at SE1106 that the calculated probability exceeds the predetermined value (Y at SE1106), then the remote control system proceeds to SE1108 and repeats the processing from SE1109 to SE1113 until operation priorities of all apparatuses in the other rooms to be managed have been set (SE1108 to SE1113).

More specifically, first, at SE1109, the remote control system confirms setting condition of an emergency degree with reference to the operation priority management table illustrated in FIG. 6.

Subsequently, at SE1110, the remote control system sets operation priorities of apparatuses in a target room to be managed.

Subsequently, at SE1111, the remote control system calculates a probability that each apparatus is being powered ON at the same time on the same day of the week, with reference to the apparatus operation log table illustrated in FIG. 11. Then, it is determined that the calculated probability exceeds a predetermined value (70% in Variation 1). Here, if the calculated probability exceeds the predetermined value (Y at SE1111), then at following SE1112, the operation priority of the apparatus is set to "high", and the processing proceeds to SE1105.

Next, the remote control system sorts apparatus IDs in descending order of operation priority (SE1115).

Finally, the remote control system gathers the operation priorities for each apparatus type and then scores the apparatus type, and sorts icons of the apparatus types in descending order of the score (SE1116).

(Variation 2)

In Variation 2, the description is given for the case where a camera or the like which is capable of distinguishing between individual people are used in addition to the human detection sensor as means for detecting the presence of the person 20.

FIG. 14 illustrates an example of the sensor information management table according to Variation 2 of Embodiment. According to the sensor information management table illustrated in FIG. 14, the control system can manage pieces of sensor information for each room under an environment where individual people can be distinguished.

Like the sensor information management table in FIG. 5, in the sensor information management table illustrated in FIG. 14, a list of "rooms" are managed. For each of the rooms, a "sensor ID", a "sensor type", and a "value" of each of sensors are managed. In Variation 2, in each of the living room and the bedroom, there are a temperature sensor, a humidity sensor, a human detection sensor, an illuminance sensor, and a camera capable of distinguishing between individual people. Values of these sensors are managed in the sensor information management table illustrated in FIG. 14. In the laundry room, there are a temperature sensor, a human detection sensor, and a camera capable of distinguishing between individual people. Values of these sensors are managed in the sensor information management table illustrated in 14.

Figure 15:
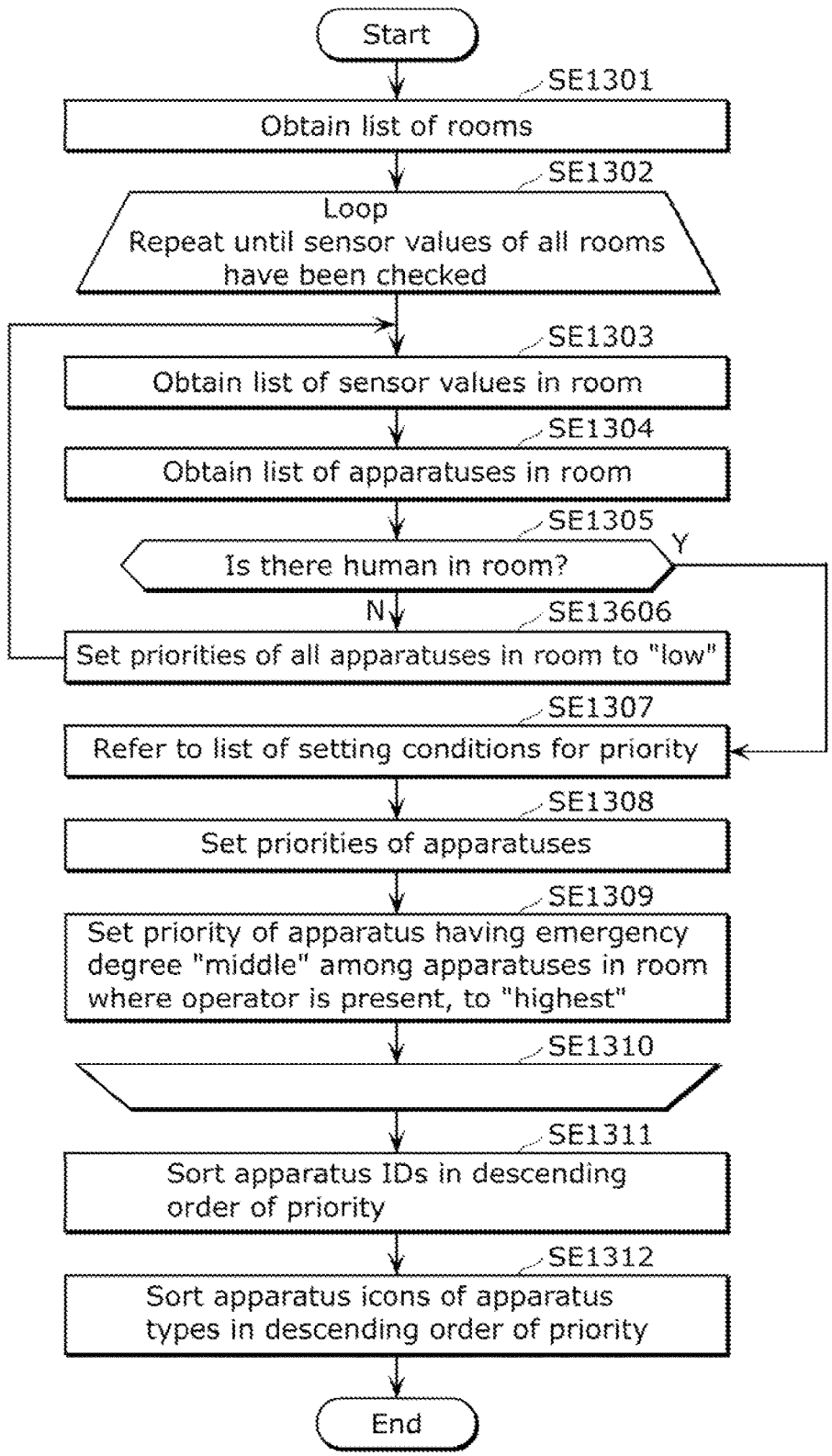
FIG. 15 is a detailed flowchart of icon sorting processing at S4 according to Variation 2 of Embodiment.

Next, an example of the icon sorting processing at S4 is described in more detail according to Variation 2 with reference to FIG. 15.

FIG. 15 is a detailed flowchart of the icon sorting processing at S4 according to Variation 2 of Embodiment. In Variation 2, icon sorting processing is performed based on a result of distinguishing between individual people.

First, the remote control system obtains a list of rooms in home with reference to the apparatus state information management table illustrated in FIG. 4 (SE1301).

Next, until values of sensors in all the rooms to be managed in home have been obtained, the remote control system repeats the processing, from SE1302 to SE1310 (SE1302 to SE1310).

More specifically, at SE1303, the remote control system obtains values of the sensors in all the rooms (rooms 3 and 4) to be managed in home, with reference to the sensor information management table illustrated in FIG. 5.

Subsequently, at SE1304, with reference to the apparatus state information management table illustrated in FIG. 4, the remote control system obtains a list of apparatuses in each of the target rooms (rooms 3 and 4).

Next, at SE1305, with reference to a value of a human detection sensor in each of the target rooms (rooms 3 and 4), the remote control system determines whether or not the person 20 is in the target room. Here, if, for example, it is determined that there is no human in the room 4 (N at SE1305), then the processing proceeds to SE1306. Then, at SE1306, the remote control system sets operation priorities of all apparatuses in the room 4 to "low" level, and the processing returns to SE1302.

On the other hand, at SE1305, if it is determined that there is a human in the room 3 (Y at Step SE1305), the remote control system confirms setting conditions of the operation priorities with reference to the operation priority management table illustrated in FIG. 6 at SE1307, and sets the operation priorities of the apparatuses in the target room at SE1308.

Subsequently, at SE1309, the remote control system detects which room the person 20 (operator of the information terminal 10) is in, and sets (changes) an emergency degree of an apparatus having a "middle" operation priority at the stage of SE1308 among the apparatuses in the room where the person 20 is present to "highest". Then, the processing proceeds to SE1311.

Next, the remote control system sorts apparatus IDs in descending order of operation priority (SE1311).

Finally, the remote control system gathers the operation priorities for each apparatus type and then scores the apparatus type, and sorts icons of the apparatus types in descending order of the score (SE1312).

Figure 16A:
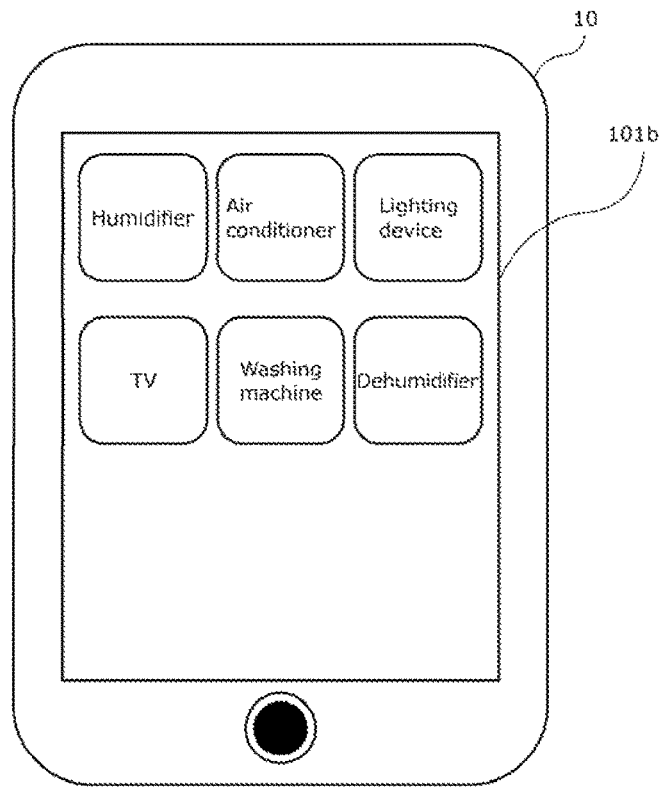
FIG. 16A is a diagram illustrating an example of a display screen of an information terminal on which one of apparatus icons is selected and developed, according to Variation 2 of Embodiment.
Figure 16B:
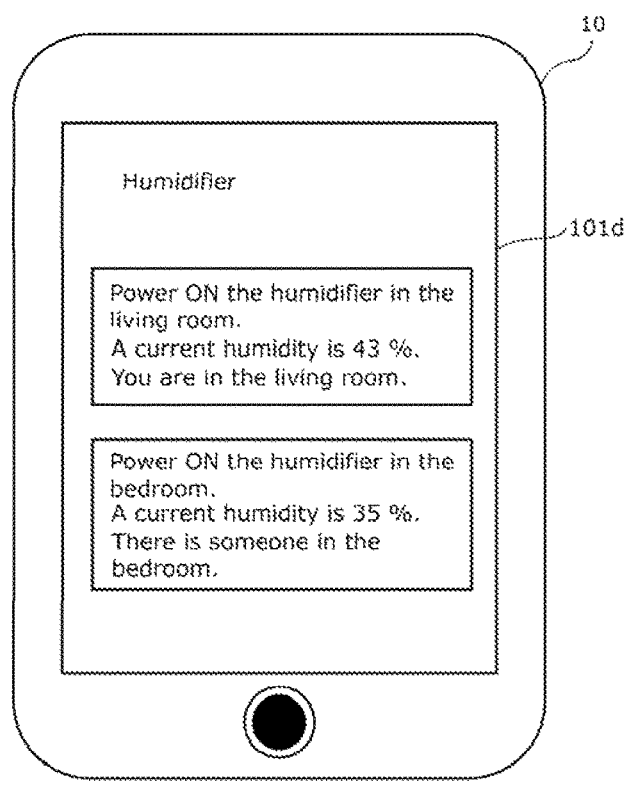
FIG. 16B is a diagram illustrating an example of the display screen of the information terminal on which one of apparatus icons is selected and developed, according to Variation 2 of Embodiment.

Each of FIGS. 16A and 16B is a diagram illustrating an example of the display screen of the information terminal on which one of the apparatus icons is selected and developed, according to Variation 2 of Embodiment. FIG. 16A is the same diagram as FIG. 7B. FIG. 16B illustrates an example where, when the apparatus icon of the "humidifier" is selected on the display screen 101b illustrated in FIG. 16A, all operable control menus (apparatus operation buttons) belonging to the "humidifier" are sorted in descending order of operation priority and displayed on the display screen 101d. Here, a control menu (apparatus operation button) having a higher priority is displayed on an upper position on the display screen 101d. The operator of the information terminal 10 (remote control application) is assumed to be in the "living room". More specifically, as a result of executing the flow of FIG. 15, the operation priority of the "humidifier" in the "bedroom" is "high", and the operation priority of the "humidifier" in the "living room" is "highest". Therefore, a control menu (apparatus operation button) of the "humidifier" in the "living room" is displayed at an upper position than a position of a control menu related to the "bedroom" on the display screen 101d.

As described above, according to the present invention, it is possible to provide the control method capable of appropriately controlling a target apparatus by using an information terminal according to a situation of the target apparatus.

Although the control method used in the remote control system according to the aspect of the present invention has been described based on Embodiment, the present invention is not limited to the embodiment. Those skilled in the art will be readily appreciated that various modifications of the embodiment and various combinations of the constituent elements in different examples and variations are possible without materially departing from the novel teachings and advantages of the present invention. Accordingly, all such modifications and combinations are intended to be included within the scope of the present invention.

It should be noted that, in the above-described Embodiment, each of the constituent elements may be implemented into a dedicated hardware or implemented by executing a software program suitable for the constituent element. Each of the constituent elements may be implemented when a program execution unit such as a Central Processing Unit (CPU) or a processor reads a software program recorded on a recording medium such as a hard disk or a semiconductor memory and executes the readout software program.

INDUSTRIAL APPLICABILITY

The present invention can be used in a control method of a remote control system, and used also in a control method using a mobile information terminal or the like having an integrated remote control UI or a remote control function for cooperating with home appliances.

REFERENCE SIGNS LIST 1 wireless bridge
2 wired network
3, 4 room
10 information terminal
20 person
33, 34, 43, 44 apparatus
31, 41 human detection sensor
32, 42 sensor
101 display unit
101a, 101b, 101c, 101d display screen
102 obtainment nit
103 control unit
104 generation unit
105 communication unit
106 memory

The invention claimed is:

1. A control method used in a remote control system including a plurality of apparatuses and an information terminal that controls at least one of the apparatuses as a target apparatus via a network, the control method comprising:

obtaining, via the network,
  (a) pieces of apparatus state information of the plurality of apparatuses, respectively, the pieces of the apparatus state information each including an apparatus type and an apparatus operational behavior,
  (b) sensor information indicating at least one including a sensed value of a spatial environment condition,
  (c) information indicating which of the plurality of apparatuses are in which rooms,
  (d) person sensor information indicating whether a person is present in each room, respectively, and
  (e) apparatus priority levels, for each apparatus, correlated with predetermined sensor-value-ranges of the spatial environment condition;

determining, for each room in which the person sensor information (d) indicates that a person is present, a score indicating priorities of target apparatus candidates, which are apparatuses that are indicated as being in the room by the information (c), the score prioritizing the target apparatus candidates according to the apparatus priority levels (e), the pieces of apparatus state information (a), and the sensor information (b);

sorting, according to the determined score, pieces of identification information identifying the target apparatus candidates;

displaying, on the user interface region of the display unit of the information terminal, apparatus icons in an arrangement in accordance with the sorted pieces of identification information, the arrangement having rows and columns and reflecting the priorities indicated by the score;

generating a control signal for causing, as the target apparatus, an apparatus corresponding to an apparatus icon to perform an operation, when the apparatus icon is selected from the apparatus icons which are displayed; and transmitting the control signal to the target apparatus via the network.

2. The control method according to claim 1, wherein the generating of the control signal includes:

displaying, on the user interface region of the display unit of the information terminal, one or more control menus corresponding to the target apparatus corresponding to the apparatus icon which is selected; and generating the control signal for causing the target apparatus according to a control menu to perform an operation, when the control menu is selected from the one or more control menus displayed on the user interface region of the display unit of the information terminal.

3. The control method according to claim 1, wherein in the sorting of the pieces of identification information, an apparatus icon indicating an apparatus determined as having a higher priority is displayed on an upper position on a more left or right side of the user interface region of the display unit of the information terminal as viewed by an operator of the information terminal.

4. The control method according to claim 1, wherein in the determining of the score, based on the pieces of the apparatus state information and the sensor information which are obtained in the obtaining, among the target apparatus candidates, an apparatus offering, when controlled by the information terminal, more comfort in a space where an operator of the information terminal is present is determined to have a higher priority.

5. The control method according to claim 1, wherein in the determining of the score, based on the pieces of the apparatus state information and the sensor information which are obtained in the obtaining, among the target apparatus candidates, an apparatus in a space where an operator of the information terminal is not present is determined to have a lower priority than an apparatus in a space where the operator of the information terminal is present.

6. The control method according to claim 1, wherein in the determining of the score, based on the pieces of the apparatus state information and the sensor information which are obtained in the obtaining, among the target apparatus candidates, an apparatus that is currently powered OFF is determined to have a lower priority than an apparatus that is currently powered ON.

7. The control method according to claim 1, wherein the apparatus icons are displayed according to an arrangement including at least two rows and two columns and reflecting levels of the priorities of the target apparatus candidates.

* * * * *